(12) United States Patent
Parekh et al.

(10) Patent No.: US 9,247,467 B2
(45) Date of Patent: Jan. 26, 2016

(54) RESOURCE ALLOCATION DURING TUNE-AWAY

(75) Inventors: Nileshkumar J. Parekh, San Diego, CA (US); Fatih Ulupinar, San Deigo, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1324 days.

(21) Appl. No.: 11/260,925

(22) Filed: Oct. 27, 2005

(65) Prior Publication Data

US 2007/0099614 A1    May 3, 2007

(51) Int. Cl.
| | |
|---|---|
| *H04W 24/00* | (2009.01) |
| *H04W 36/00* | (2009.01) |
| H04W 28/18 | (2009.01) |
| H04W 36/14 | (2009.01) |
| H04W 72/04 | (2009.01) |
| H04W 88/06 | (2009.01) |

(52) U.S. Cl.
CPC .......... *H04W 36/0083* (2013.01); *H04W 28/18* (2013.01); *H04W 36/14* (2013.01); *H04W 72/04* (2013.01); *H04W 88/06* (2013.01)

(58) Field of Classification Search
CPC .................................................... H04W 24/00
USPC ........ 455/423, 425, 456.1, 125, 173.1, 177.1, 455/181, 185.1, 187.1, 186.1, 436; 370/331, 332, 338
See application file for complete search history.

(56) References Cited

U.S. PATENT DOCUMENTS

| | | | |
|---|---|---|---|
| 5,260,943 | A | 11/1993 | Comroe et al. |
| 5,533,014 | A | 7/1996 | Willars et al. |
| 5,640,679 | A | 6/1997 | Lundqvist et al. |
| 5,828,659 | A | 10/1998 | Teder et al. |
| 6,067,442 | A | 5/2000 | Wiedeman et al. |
| 6,069,880 | A | 5/2000 | Owen et al. |
| 6,072,847 | A | 6/2000 | Dupuy et al. |
| 6,097,709 | A | 8/2000 | Kuwabara |

(Continued)

FOREIGN PATENT DOCUMENTS

| | | |
|---|---|---|
| CL | 2901-2006 | 10/2006 |
| CL | 2903-2006 | 10/2006 |

(Continued)

OTHER PUBLICATIONS

Tomcik J.: IEEE 802.20, "MBFFDD and MBTDD Wideband Mode: Technology Overview", Jan. 6, 2006, p. 1, 71-75, 105-107.

(Continued)

*Primary Examiner* — Muthuswamy Manoharan

(57) ABSTRACT

A resource assignment method during a tune-away procedure comprises determining a first instance in time that a tune-away will initiate with respect to an access terminal, determining a second instance in time that corresponds to a latest frame boundary associated with the access terminal prior to the instance in time that the tune-away initiates, and determining resource assignment parameters associated with the access terminal and implementing the resource assignment parameters at the second instance in time. The method can further comprise ceasing communications to the access terminal over a forward link at the second instance in time and discontinuing monitoring reverse link control channels associated with the access terminal at the second instance in time.

31 Claims, 11 Drawing Sheets

(56) References Cited

U.S. PATENT DOCUMENTS

| | | |
|---|---|---|
| 6,119,005 A | 9/2000 | Smolik |
| 6,122,270 A | 9/2000 | Whinnett et al. |
| 6,157,845 A | 12/2000 | Henry et al. |
| 6,181,943 B1 | 1/2001 | Kuo et al. |
| 6,195,551 B1 | 2/2001 | Kim et al. |
| 6,246,673 B1 | 6/2001 | Tiedemann, Jr. et al. |
| 6,282,420 B1 | 8/2001 | Bamburak et al. |
| 6,331,971 B1 | 12/2001 | Raith |
| 6,400,952 B2 | 6/2002 | Kim et al. |
| 6,465,803 B1 | 10/2002 | Bowers et al. |
| 6,466,803 B1 | 10/2002 | Gardner |
| 6,498,933 B1 | 12/2002 | Park et al. |
| 6,510,146 B1 | 1/2003 | Korpela et al. |
| 6,522,670 B1 | 2/2003 | Jokinen et al. |
| 6,563,807 B1 | 5/2003 | Kim |
| 6,584,318 B2 | 6/2003 | Hakalin et al. |
| 6,603,751 B1 | 8/2003 | Odenwalder |
| 6,608,818 B1 | 8/2003 | Abrol et al. |
| 6,614,769 B1 | 9/2003 | Eteminan et al. |
| 6,665,281 B1 | 12/2003 | Kim |
| 6,668,170 B2 | 12/2003 | Costa et al. |
| 6,810,019 B2 * | 10/2004 | Steudle ............ 370/252 |
| 6,829,481 B2 | 12/2004 | Souissi |
| 6,845,238 B1 | 1/2005 | Muller |
| 6,891,612 B1 | 5/2005 | Bender |
| 6,934,526 B2 | 8/2005 | Choi et al. |
| 6,959,201 B2 | 10/2005 | Leprieur et al. |
| 6,999,765 B2 | 2/2006 | Hokao |
| 7,003,290 B1 | 2/2006 | Salonaho et al. |
| 7,020,108 B2 | 3/2006 | Virtanen |
| 7,024,194 B1 | 4/2006 | Oksanen |
| 7,089,004 B2 | 8/2006 | Jeong et al. |
| 7,110,766 B1 | 9/2006 | Tayloe et al. |
| 7,133,702 B2 | 11/2006 | Amerga et al. |
| 7,151,756 B1 | 12/2006 | Park et al. |
| 7,324,479 B2 | 1/2008 | Hur |
| 7,336,951 B2 | 2/2008 | Choi et al. |
| 7,340,251 B1 | 3/2008 | McClure |
| 7,363,039 B2 | 4/2008 | Laroia et al. |
| 7,367,424 B2 | 5/2008 | Brown et al. |
| 7,376,424 B2 | 5/2008 | Il-Gyu et al. |
| 7,379,440 B2 | 5/2008 | Gopal |
| 7,382,750 B2 | 6/2008 | Wu |
| 7,409,214 B2 | 8/2008 | Lee |
| 8,064,405 B2 | 11/2011 | Parekh et al. |
| 8,457,075 B2 | 6/2013 | Parekh et al. |
| 2001/0016482 A1* | 8/2001 | Bergstrom et al. ......... 455/332 |
| 2002/0003784 A1 | 1/2002 | Okabe et al. |
| 2002/0019231 A1 | 2/2002 | Palenius et al. |
| 2002/0187804 A1 | 12/2002 | Narasimha et al. |
| 2003/0095513 A1 | 5/2003 | Woodmansee et al. |
| 2003/0152049 A1 | 8/2003 | Turner |
| 2003/0218995 A1 | 11/2003 | Kim et al. |
| 2003/0227946 A1 | 12/2003 | Schwarz et al. |
| 2004/0208140 A1 | 10/2004 | Noguchi et al. |
| 2004/0224696 A1 | 11/2004 | Korneluk et al. |
| 2005/0054368 A1 | 3/2005 | Amerga |
| 2005/0058151 A1 | 3/2005 | Yeh |
| 2005/0073977 A1 | 4/2005 | Vanghi et al. |
| 2005/0111358 A1 | 5/2005 | Hsu et al. |
| 2005/0122922 A1 | 6/2005 | Wu et al. |
| 2005/0192011 A1 | 9/2005 | Hong et al. |
| 2005/0202813 A1 | 9/2005 | Saito |
| 2005/0216580 A1 | 9/2005 | Raji et al. |
| 2005/0245253 A1* | 11/2005 | Khushu et al. ............ 455/423 |
| 2005/0252262 A1 | 11/2005 | Imai et al. |
| 2005/0272403 A1 | 12/2005 | Ryu et al. |
| 2006/0062180 A1 | 3/2006 | Sayeedi et al. |
| 2006/0166676 A1 | 7/2006 | Rajkotia et al. |
| 2006/0176870 A1* | 8/2006 | Joshi et al. ............... 370/345 |
| 2006/0223557 A1 | 10/2006 | Manohar |
| 2007/0030830 A1 | 2/2007 | Sagne et al. |
| 2007/0042717 A1 | 2/2007 | Alexiou et al. |
| 2007/0097922 A1 | 5/2007 | Parekh et al. |
| 2007/0097931 A1 | 5/2007 | Parekh et al. |
| 2007/0099619 A1 | 5/2007 | Parekh et al. |
| 2007/0110022 A1* | 5/2007 | Palenius et al. ............ 370/350 |
| 2007/0218835 A1 | 9/2007 | Hindelang et al. |
| 2008/0020769 A1 | 1/2008 | Parekh et al. |

FOREIGN PATENT DOCUMENTS

| | | | |
|---|---|---|---|
| CL | 2904-2006 | 10/2006 | |
| CL | 2906-2006 | 10/2006 | |
| CL | 2907-2006 | 10/2006 | |
| CL | 2908-2006 | 10/2006 | |
| CN | 1176717 | 3/1998 | |
| CN | 1324531 A | 11/2001 | |
| CN | 1379963 A | 11/2002 | |
| CN | 1399855 | 2/2003 | |
| CN | 1400835 A | 3/2003 | |
| EP | 0696147 | 2/1996 | |
| EP | 948231 A2 * | 10/1999 | |
| EP | 1030477 | 8/2000 | |
| EP | 1117268 A1 * | 7/2001 | ............ H04Q 7/38 |
| EP | 1467518 | 10/2004 | |
| EP | 1467582 A1 | 10/2004 | |
| JP | 6343056 A | 12/1994 | |
| JP | 10512728 | 12/1998 | |
| JP | 11075237 A | 3/1999 | |
| JP | 2001095031 | 4/2001 | |
| JP | 2002528009 T | 8/2002 | |
| JP | 2002541747 T | 12/2002 | |
| JP | 2003032756 A | 1/2003 | |
| JP | 2003506983 | 2/2003 | |
| JP | 2003508991 T | 3/2003 | |
| JP | 2004504783 | 2/2004 | |
| JP | 2004282557 | 10/2004 | |
| JP | 2004534412 | 11/2004 | |
| JP | 2004343356 A | 12/2004 | |
| JP | 2005500745 T | 1/2005 | |
| JP | 2005101788 | 4/2005 | |
| JP | 2005522119 T | 7/2005 | |
| JP | 2005260426 A | 9/2005 | |
| JP | 2005260427 A | 9/2005 | |
| KR | 1020010024152 | 3/2001 | |
| KR | 20010102418 | 11/2001 | |
| KR | 0347415 | 7/2002 | |
| KR | 1020020060391 | 7/2002 | |
| RU | 2180159 C2 | 2/2002 | |
| RU | 2003125611 | 2/2005 | |
| WO | 9429981 | 12/1994 | |
| WO | 9616524 | 5/1996 | |
| WO | WO9623369 A1 | 8/1996 | |
| WO | 9632821 | 10/1996 | |
| WO | 9923844 | 5/1999 | |
| WO | 9943178 | 8/1999 | |
| WO | 0022837 | 4/2000 | |
| WO | WO0041429 A1 | 7/2000 | |
| WO | WO0060895 | 10/2000 | |
| WO | WO0111914 | 2/2001 | |
| WO | 0120942 | 3/2001 | |
| WO | WO0117307 A1 | 3/2001 | |
| WO | 0239758 | 5/2002 | |
| WO | WO03017596 A2 | 2/2003 | |
| WO | WO03084253 A1 | 10/2003 | |
| WO | 2004091231 | 10/2004 | |

OTHER PUBLICATIONS

Tomcik. J. "MBFDD and MBTDD Wideband Mode: Technology Overview," (Oct. 2005), pp. 1-109.

Turner, S. et al.: "CDMA2000 Hybrid Access Terminal Operation White Paper," (Apr. 2001), pp. 1-25.

3GPP TR 25.922 v.6.0.1: 3rd Generation Partnership Project; Technical Specification Group Radio Access Network; Radio resource management strategies (Release 6) (Apr. 2004) pp. 15-31.

International Search Report—PCT/US06/042057, International Search Authority—European Patent Office—Apr. 13, 2007.

Written Opinion—PCT/US06/042057, International Search Report—European Patent Office—Apr. 27, 2008.

(56) References Cited

OTHER PUBLICATIONS

International Preliminary Report on Patentability—PCT/US06/042057, The International Bureau of WIPO—Geneva, Switzerland—Apr. 29, 2008.
Taiwanese Search Report—No. 095139917—TIPO—Dec. 30, 2009.
Translation of Office Action in Japanese application 2008-538005 corresponding to U.S. Appl. No. 11/261,824, dated Nov. 30, 2010.
Translation of Office Action in Korean application 2008-7012741 corresponding to U.S. Appl. No. 11/261,824, dated Feb. 28, 2011.
UMTS; Radio Resource Management Strategies, ETSI TR 25.922 V3.6.0 (Sep. 2001).
Ramani et al., "SyncScan: practical fast handoff for 802.11 infrastructure networks", 24th Annual Joint Conference of the IEEE Computer and Communications Societies, INFOCOM 2005, Mar. 2005, pp. 675-684, vol. 1, IEEE.

* cited by examiner

RESOURCE ALLOCATION DURING TUNE-AWAY

REFERENCE TO CO-PENDING APPLICATIONS FOR PATENT

The present Application for Patent is related to the following co-pending U.S. Patent Applications:

U.S. application Ser. No. 11/261,804, entitled, "INTER-FREQUENCY HANDOFF", filed concurrently herewith, assigned to the assignee hereof, and expressly incorporated by reference herein; U.S. application Ser. No. 11/261,824, entitled, "TUNE-AWAY AND CROSS PAGING SYSTEMS AND METHODS", filed concurrently herewith, assigned to the assignee hereof, and expressly incorporated by reference herein; U.S. application Ser. No. 11/261,803, entitled, "TUNE-AWAY PROTOCOLS FOR WIRELESS SYSTEMS", filed concurrently herewith, assigned to the assignee hereof, and expressly incorporated by reference herein; and U.S. Application No. 60/731,013, entitled, "MOBILE WIRELESS ACCESS SYSTEM," filed concurrently herewith, assigned to the assignee hereof, and expressly incorporated by reference herein.

BACKGROUND

I. Field

The following description relates generally to wireless communications, and, amongst other things, to flexible communication schemes for wireless communications systems.

II. Background

In the not too distant past mobile communication devices in general, and mobile telephones in particular, were luxury items only affordable to those with substantial income. Further, these mobile telephones were significant in size, rendering them inconvenient for extended portability. For example, in contrast to today's mobile telephones (and other mobile communication devices), mobile telephones of the recent past could not be placed into a user's pocket or handbag without causing extreme discomfort. In addition to deficiencies associated with mobile telephones, wireless communications networks that provided services for such telephones were unreliable, covered insufficient geographical areas, were associated with inadequate bandwidth, and were associated with various other deficiencies.

In contrast to the above-described mobile telephones, mobile telephones and other devices that utilize wireless networks are now commonplace. Today's mobile telephones are extremely portable and inexpensive. For example, a typical modem mobile telephone can easily be placed in a handbag without a user thereof noticing existence of the telephone. Furthermore, wireless service providers often offer sophisticated mobile telephones at no cost to persons who subscribe to their wireless service. Numerous towers that transmit and/or relay wireless communications have been constructed over the last several years, thus providing wireless coverage to significant portions of the United States (as well as several other countries). Accordingly, millions (if not billions) of individuals own and utilize mobile telephones.

To effectuate continued coverage for mobile stations, access points (base stations, access nodes, etc.) associated with cellular networks are geographically positioned so that as users change location they do not lose services. Thus, mobile stations can be "handed off" from a first base station to a second base station. In other words, a mobile station will be serviced by a first base station while in a geographic region associated with such base station. When the mobile station is transported to a region associated with a second base station, the mobile station will be handed off from the first base station to the second base station. Ideally, the handoff occurs without data loss, loss of service, and the like.

Conventionally, this handoff occurred through a significant amount of messaging between mobile stations and base stations. For instance, as a mobile station was transported toward a base station, various messages were delivered between the mobile station and the base station, as well as between the base station and a base station currently servicing the mobile station. This messaging enables assignment of resources with respect to forward link and reverse link channels to be made between the mobile station and the base stations. To enable a handoff to occur quickly and without loss of a substantial amount of data, a set of base stations can be prepared to provide services to the mobile station. This set of base stations can be updated as the geographic region associated with the mobile station is altered. In more detail, the mobile station can be adapted to monitor for communications or receive communications over a first frequency from a first base station. A second base station can communicate with the mobile station over the same frequency, and the second base station can be added to the set of base stations if particular performance parameters are met. Once the base station is added to the set, it is prepared to service the mobile station once it becomes within a particular geographic range of such base station. The handoff between base stations occurs expediently as well as without loss of any significant amount of data.

Problems arise, however, if base stations associated with disparate technologies or communication protocols are desirably added to the set of base stations, as mobile stations with single receive chains cannot simultaneously communicate between systems and/or over disparate frequencies.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Disclosed herein are systems, methods, apparatuses, and articles of manufacture that facilitate allocation of resources during a tune-away procedure. A tune-away refers generally to a brief discontinuation of services from an access point or sector to an access terminal while the access terminal is receiving pilot signals from a disparate access point or sector. This may be desirable when an access point or sector that is currently providing services to the access terminal communicates to the access terminal over a first frequency while an access point or sector that may provide services to the access terminal in the future communicates to the access terminal over a second frequency. In another example, the first access point can be associated with a first technology, such as MBWA, while a second access point can be associated with a second technology, such as 802.11 a/g. Accordingly, if the access terminal is not associated with multiple receive chains, such terminal may undertake a tune-away to communicate with disparate access points in order to prepare such access points for future provision of services to the access terminal.

To that end, disclosed herein is a resource assignment method undertaken during a tune-away procedure at an access point or sector, wherein the method comprises determining a first instance in time that a tune-away will initiate with respect to an access terminal, determining second instance in time that corresponds to a latest frame boundary associated with the access terminal prior to the instance in time that the tune-away initiates, and determining resource assignment parameters associated with the access terminal and implementing the resource assignment parameters at the second instance in time. The method can further include suspending communications to the access terminal over a forward link and suspending monitoring reverse link control channels associated with the access terminal. The method can further comprise optimizing resource allocations prior to the tune-away and/or upon completion of the tune-away.

Additionally, a wireless communications apparatus is disclosed herein, wherein the apparatus comprises a memory that includes a schedule for a tune-away with respect to an access terminal, as well as a processor that implicitly expires resource assignments between the access terminal and an access point associated therewith as a function of content of the schedule. The apparatus can also include a data storage unit that includes data relating to the access terminal that was cached during the tune-away. In another example, the processor can cause transmissions to be suspended on a forward link as well as cause monitoring of a reverse link to be suspended.

Further, an apparatus for allocating base station resources during a tune-away is disclosed, wherein the apparatus comprises means for determining when an access terminal is going to undertake a tune-away, and means for allocating resources to one or more disparate access terminals during the tune-away. The apparatus can further include means for caching data intended for the access terminal during the tune-away and means for providing the access terminal with the cached data upon completion of the tune-away. Moreover, the apparatus can include means for expiring resource assignments implicitly at a frame boundary prior to the tune-away and means for re-establishing the resource assignments at a frame boundary subsequent to the tune-away.

Furthermore, a computer-readable medium is described herein, where the computer-readable medium includes computer-executable instructions for receiving an indication that a tune-away will occur at time t1, locating a latest fame boundary that occurs at a first point in time prior to t1, implicitly expiring reverse link resource assignments at the first point in time, implicitly expiring forward link resource assignments at the first point in time, suspending transmissions on a reverse link after the reverse link resource assignments have been expired, suspending monitoring of a forward link after the forward link resource assignments have been expired, and performing the tune-away at time t1. The instructions can further include receiving an indication that a tune-away will be complete at a time t2, locating a frame boundary that occurs at a second point in time immediately after t2, transmitting control information on the reverse link at the second point in time, and monitoring the reverse link at the second point in time.

Moreover, a processor is described herein that executes instructions for allocating resources in a wireless communications environment, the instructions comprise locating a frame boundary that occurs just prior to performance of a tune-away upon receiving an indication that an access terminal will perform the tune-away, and expiring resource assignments associated with the access terminal at a time associated with the frame boundary. The instructions can further include allocating resources associated with the access terminal to at least one disparate access terminal during the tune-away.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
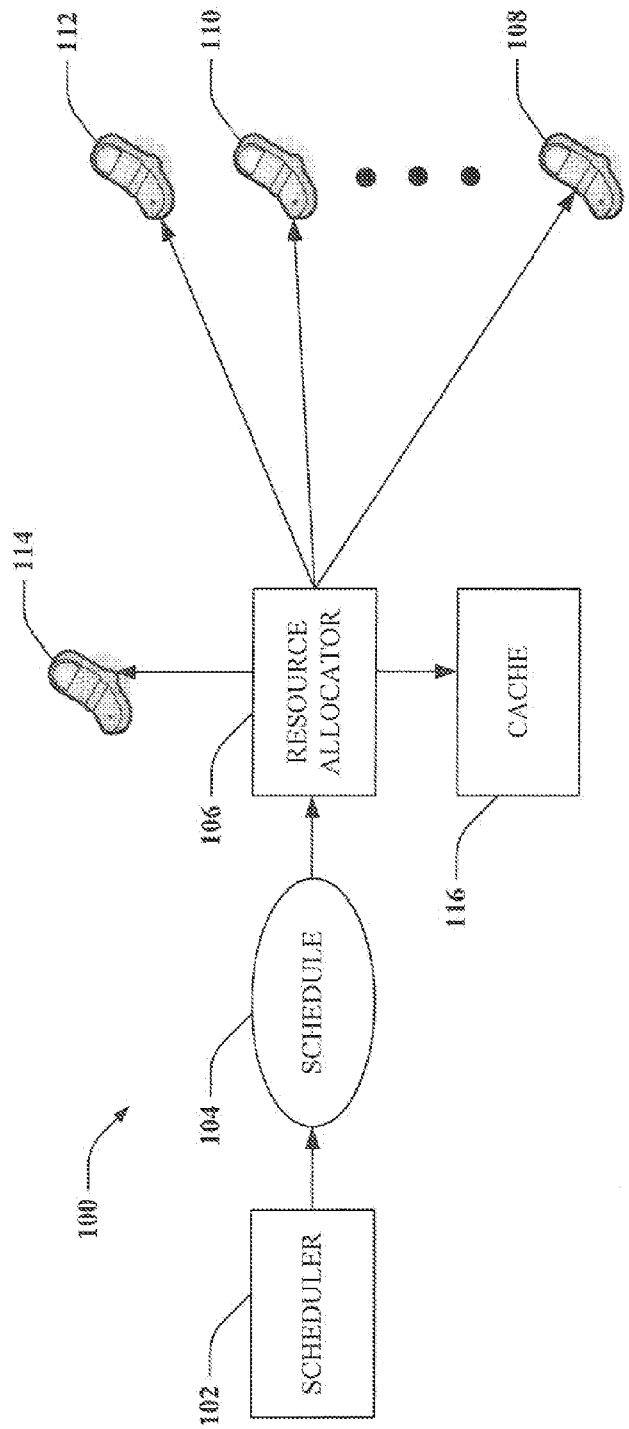
FIG. 1 is a high-level block diagram of a system that facilitates allocation of resources in a wireless communications environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the subject invention.

Furthermore, various embodiments are described herein in connection with a user device. A user device can also be called a system, a subscriber unit, subscriber station, mobile station, mobile device, remote station, remote terminal, access terminal, user terminal, terminal, user agent, or user equipment. A user device can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Turning now to the drawings, FIG. 1 illustrates a system 100 that facilitates allocation of resources within a wireless communications environment. The system 100 includes a scheduler 102 that creates a schedule 104 for communications that are to occur between base stations and mobile stations. In more detail, schedule 104 created by scheduler 102 can include information associated with a tune-away, which relates to actions undertaken by a mobile station in connection with updating a set of base stations that can be prepared to communicate with the mobile station. For example, a mobile station can tune-away from a first base station for a limited period of time to receive data, such as pilot signals, from a second base station (e.g., over a disparate frequency or a different technology). Based upon the received pilot signals, a determination can be made regarding whether to add the second base station to a set of base stations that is prepared to service the mobile station. If the second base station is added to the set, then as the mobile station is moved towards the second base station, a handoff that occurs quickly and without loss of service and/or a significant amount of data can be achieved.

While the mobile station is communicating with the second base station, however, unless it is associated with multiple receive chains, the mobile station will no longer be able to communicate with the first base station. In one particular example, a tune-away can be scheduled in terms of microseconds or some other suitable time interval (e.g., nanoseconds). This can be done instead of scheduling in terms of frames, as disparate communications systems may not be synchronous in terms of frames and/or time. A resource allocator 106 can review the schedule 104 and allocate resources to one or more access terminals 108-112 as a function of content of the schedule 104. For instance, resource allocator 106 can analyze the schedule 104 and locate a latest frame boundary just prior to a time that a tune-away is to initiate. At such time, resource allocator 106 can implicitly expire resource assignments on a forward link and a reverse link associated with an access terminal 114 that is performing the tune-away, where the term "implicitly" is used herein to indicate that no messaging is required between the access terminal 114 and a base station or sector servicing the access terminal 114. The resource allocator 106, to maintain high throughput in a wireless communications environment, can then allocate resources that were assigned to the access terminal 114 to one or more of access terminals 108-112.

Resource allocator 106, based upon an analysis of schedule 104, can locate a frame boundary that is to occur immediately subsequent to a scheduled completion of the tune-away. At such boundary, resource allocator 106 can return or re-assign the resources to access terminal 114, cause data to be delivered to access terminal 114 over the forward link, and can further facilitate monitoring of reverse link control channels with respect to the access terminal 114. Thus, a base station currently serving the access terminal 114 can allocate resources to disparate access terminals while the access terminal 114 is performing a tune-away, but services provided to access terminal 114 can be essentially uninterrupted, as a tune-away can occur quite quickly.

The system 100 can further include a cache 116 that can cache data that is intended for the access terminal 114 while such terminal 114 is performing a tune-away. For example, if access terminal 114 is receiving unicast data, while performing a tune-away, data intended for access terminal 114 can be retained in the cache 116. Upon completion of the tune-away, resource allocator 106 can access cache 116 and provide cached data to access terminal 114.

Access terminal 114 can also have access to schedule 104 in order to facilitate performing a tune-away. In more detail, at a frame boundary that occurs just prior to the tune-away, reverse link and forward link resource assignments can be expired at access terminal 114. Furthermore, transmissions in a reverse link can be suspended and access terminal 114 can suspend monitoring a forward link. At a first frame boundary that occurs subsequent to the tune-away, access terminal 114 can deliver transmissions to a servicing base station over the reverse link and begin monitoring the forward link.

Figure 2:
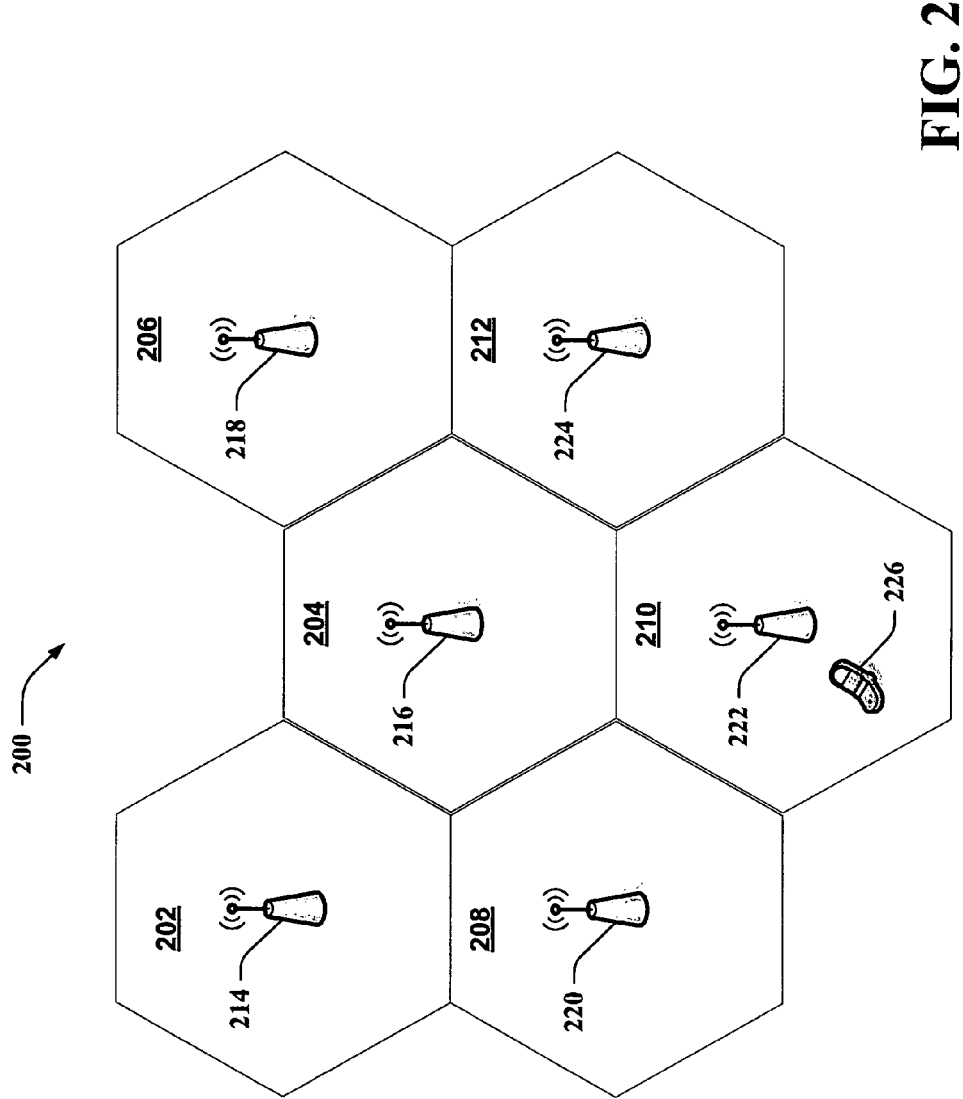
FIG. 2 is an exemplary wireless communications environment.

Now turning to FIG. 2, an exemplary wireless communications system 200 is provided, wherein benefits of a tune-away can be perceived. The system 200 includes a plurality of sectors 202-212, wherein mobile stations can employ wireless services within such sectors 202-212. While the sectors 202-212 are shown as being hexagonal in nature and of substantially similar size, it is understood that size and shape of the sectors 202-212 can vary depending upon geographical region, number, size, and shape of physical impediments, such as buildings, and several other factors. Access points 214-224 are associated with sectors 202-212, wherein access points 214-224 are utilized to provide services to access terminals within sectors 202-212. Each of the access points 214-224 can provide service to multiple access terminals. In the system 200, an access terminal 226 associated with sector 210 and thus can be serviced by access point 222. Access terminal 226, however, may be portable and can thus move to disparate sectors (e.g., out of range for suitable communications from access point 222). It is thus desirable to prepare access points to provide services to the access terminal 226 prior to the access terminal 226 entering a sector associated with such access points in order to enable a soft handoff to occur between access points.

Accordingly, a set of access points or base stations (set of sectors) can be created (e.g., an active set), wherein access points (or sectors) within such set are prepared to provide services to the access terminal 226. There may be instances, however, that access point 222 provides services to the access terminal 226 over a first frequency, while access point 218 may be able to provide services over a second frequency. In another example, the access point 222 can provide services to the access terminal 226 over a first technology while access point 218 may be adapted to provide services over a second technology. Therefore, if access terminal 226 does not include multiple receive chains, it can communicate simultaneously with multiple base stations only if such access points are associated with a same technology and communicating over a substantially similar frequency to access terminal 226. Moreover, access points within the sectors may not be associated with synchronous systems. It remains desirable, however, to maintain the set of base stations so that a soft handoff can occur as the access terminal 226 moves between sectors. Thus, the access terminal 226 can tune-away from access point 222 for a short period of time to receive pilot signals from other access points. In a detailed example, the set of base stations prepared to communicate with access terminal 226 may not include access point 220 (or sector 208). Access terminal 226 may be receiving communications over a first frequency from access point 222, while access point 220 can communicate pilot signals to access terminal 226 over a second frequency. Access terminal 226 can perform a tune-away, wherein access terminal 226 tunes away from access point 222 for a brief period of time while listening for pilot signals from access point 220. Access terminal 226 can then report pilot strength in a report message to access point 222 and/or access point 220. Based at least in part upon this reported signal strength, a determination can be made regarding whether to add access point 220 (sector 208) to the set (and prepare access point 220 or sector 208 to provide services to access terminal 226 if it is located in sector 208). During a tune-away, however, it is not desirable to tie up resources of access point 222, and resource assignments should be expired between access point 222 and access terminal 226. Upon completion of the tune-away, resources may be returned and/or may be re-assigned explicitly (e.g., through at least some messaging).

Figure 3:
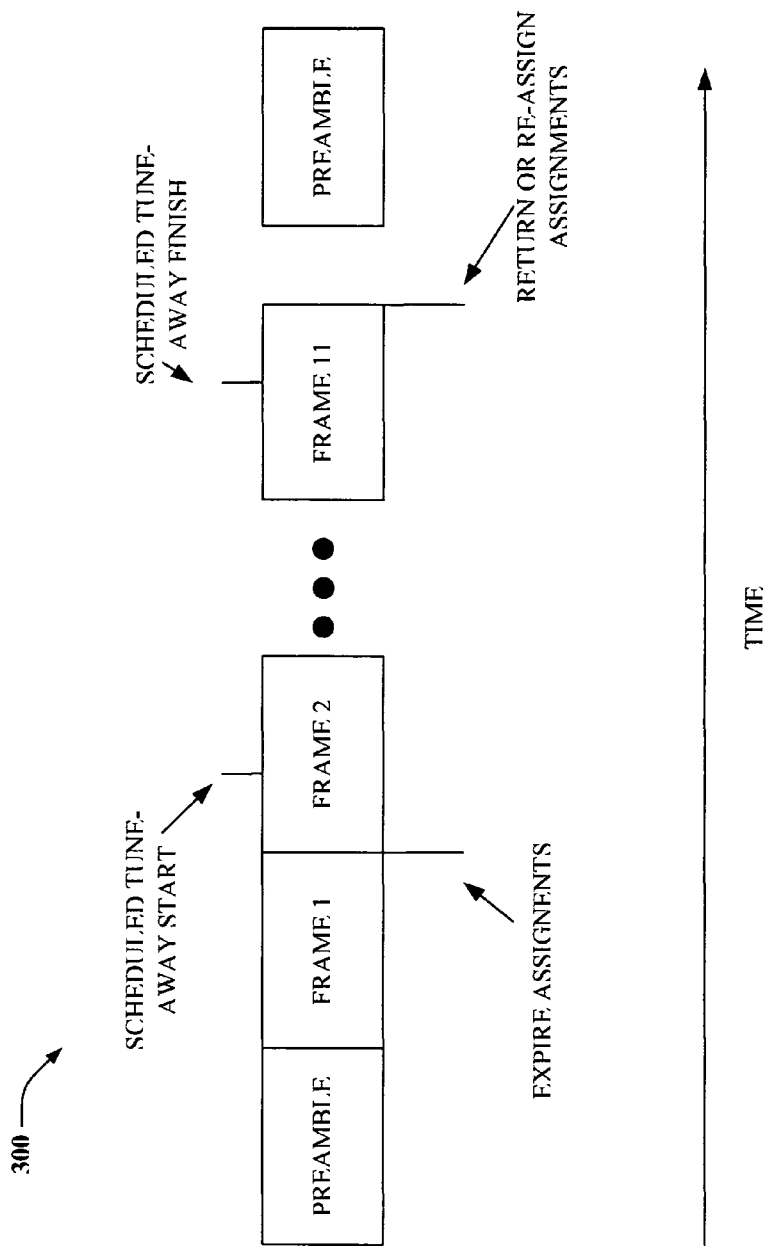
FIG. 3 is an exemplary frame structure that can be employed in a wireless environment.

Referring now to FIG. 3, an exemplary timing diagram 300 associated with a tune-away is illustrated. The timing diagram 300 illustrates initiation of a tune-away as well as completion of a tune-away. In more detail, if a tune-away is scheduled to begin at a middle of a frame, then the tune-away should initiate at a frame boundary just prior to the scheduled beginning of such tune-away. Similarly, if the tune-away is scheduled to end at a middle of a frame, the tune-away should complete at an end of a frame. In the exemplary timing diagram 300, the tune-away is scheduled to initiate at a middle of frame 2 and end at a middle of frame 11. However, resource assignments associated with an access terminal and an access point can expire and may be re-assigned, respectively, at a beginning of frame 2 and at frame 12. There may be a minimum and/or maximum time allowed for a tune-away, and time corrections can be made with respect to an access point and an access terminal if desirable.

Figure 4:
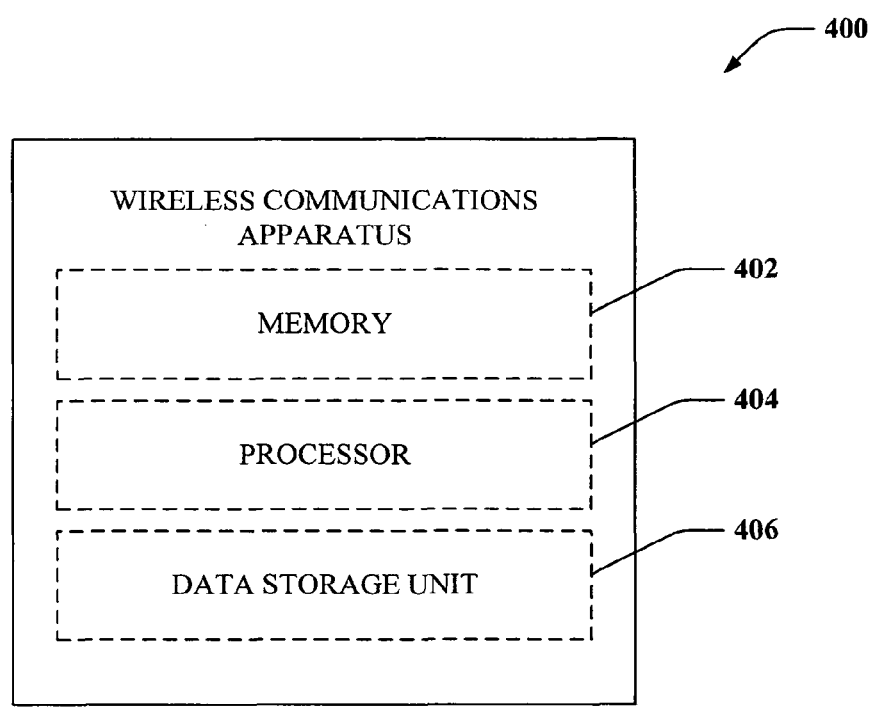
FIG. 4 is an apparatus that facilitates allocation of resources in a wireless communications environment.

Turning now to FIG. 4, a wireless apparatus 400 for employment in a wireless communications environment is illustrated. The apparatus includes a memory 402 that can comprise a schedule for a tune-away with respect to an access terminal. For example, the schedule can include an access point that is providing services to the access terminal as well as an access point with respect to which a tune-away is going to occur. The schedule can further include timing information relating to when in time that the tune-away will occur. A processor 404 associated with memory 402 can execute instructions to expire resource assignments between the access terminal and a base station that provides service to the access terminal. If the tune-away is scheduled to begin or end in the middle of a frame boundary, the expiration can occur at a point in time that coincides with the frame boundary, and the processor 404 can effectuate such expiration. A re-assignment of resources can be performed after the tune-away has been completed.

In more detail, with respect to an access point, the processor 404 can cause transmissions to be suspended on a forward link and can cause suspension of monitoring on a reverse link at the time that corresponds to the frame boundary. Thus, the processor 404 can be employed to determine the time that corresponds to the frame boundary immediately prior to a time of commencement of the tune-away, and thereafter expire resource assignments, suspend communications on the forward link, and suspend monitoring on the reverse link. The processor 404 can also determine a time that corresponds to a frame boundary that will be received/delivered immediately subsequent to the tune-away. At such time, the processor 404 can be employed to re-assign the resources as well as cause the access point to begin transmitting on the forward link and monitoring communications on the reverse link. The apparatus 400 can also include a data storage unit 406, wherein data intended for the access terminal during the tune-away can be cached. After completion of the tune-away, the processor 404 can be employed in connection with providing the cached data to the access terminal.

Referring to FIGS. 5-8, methodologies relating to allocating resources during a tune-away are illustrated. While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

Figure 5:
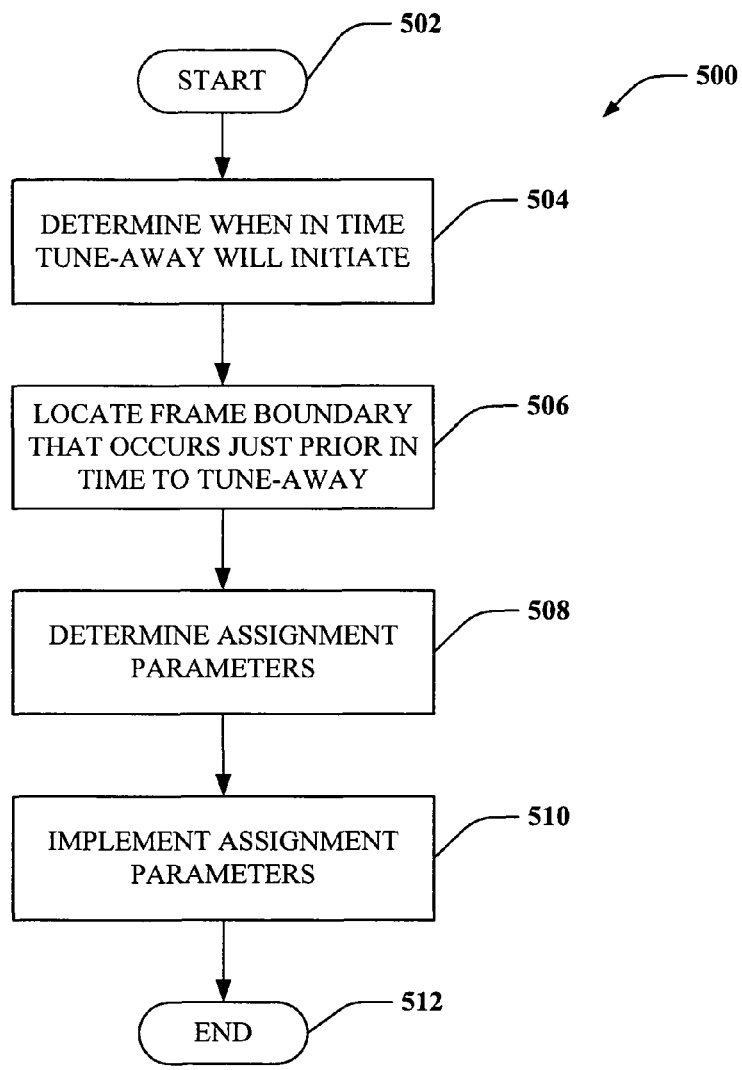
FIG. 5 is a representative flow diagram illustrating a methodology for allocating resources during a tune-away.

Referring solely to FIG. 5, a method 500 for expiring resource assignments during a tune-away is illustrated. The methodology 500 begins at 502, and at 504 a determination is made regarding when in time a tune-away will initiate with respect to an access terminal. As described above, a tune-away can be desirable to update a set of access points (sectors, base stations, etc.) so that access points or sectors within the set can be prepared to provide services to an access terminal. In one example, the time can be in micro-seconds, and can be corrected depending upon a type of system for which an access terminal is tuning away. This time can be determined based upon a schedule, wherein the schedule may be created by the access terminal. The schedules can be provided to one or more base stations, which can then communicate with the access terminal accordingly.

At 506, a latest frame boundary prior to an instance in time that the tune-away will initiate is located. For example, each sector can have a notion of Mobile Broadband Wireless Access (MBWA) time beginning with a first Superframe transmitted in 1980. Based upon this notion, a schedule can be created by the access terminal and a frame boundary that occurs just prior to the tune-away can be located (e.g., a position in time that corresponds to the frame boundary). At 508, resource assignment parameters associated with the access terminal can be determined, and at 510 such resource assignment parameters can be implemented at the aforementioned frame boundary. For example, forward link and reverse link resource assignments can be implicitly expired at the access point and the access terminal. When the tune-away is completed, explicit re-assignments of resources can be performed, and the access point can continue servicing the access terminal. In another example, the resource assignment between the access point and the user terminal is maintained throughout the tune-away. The methodology 500 then completes at 512.

Figure 6:
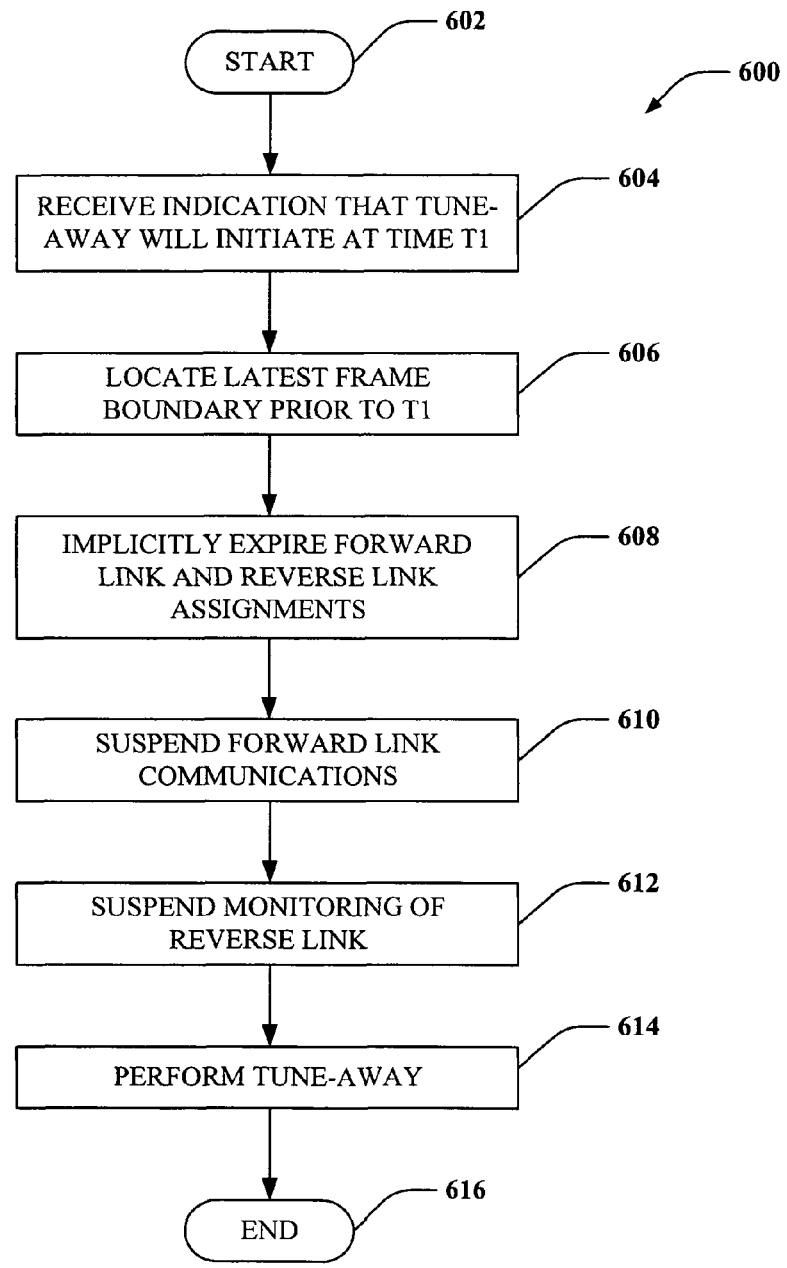
FIG. 6 is a representative flow diagram illustrating a methodology for expiring resource assignments at an access terminal during a tune-away.

Now turning to FIG. 6, a methodology 600 for allocating resources during a tune-away is illustrated. The methodology 600 initiates at 602, and at 604 an indication that a tune-away will be occurring at time t1 is received. For example, this can be determined by analyzing a tune-away schedule that is provided by an access terminal. At 606, a latest frame boundary (or a point in time associated therewith) prior to time t1 is located. At 608, a reverse link resource assignment and a forward link resource assignment are implicitly expired by the access terminal that will be performing the tune-away. At 610, transmission on a reverse link is suspended, and at 612 monitoring of a forward link (for control information from a base station) is suspended with respect to a base station that is servicing the access terminal. At 614, the tune-away is performed, wherein the tune-away can be an inter-frequency tune-away and/or an inter-technology tune-away. The methodology 600 completes at 616.

Figure 7:
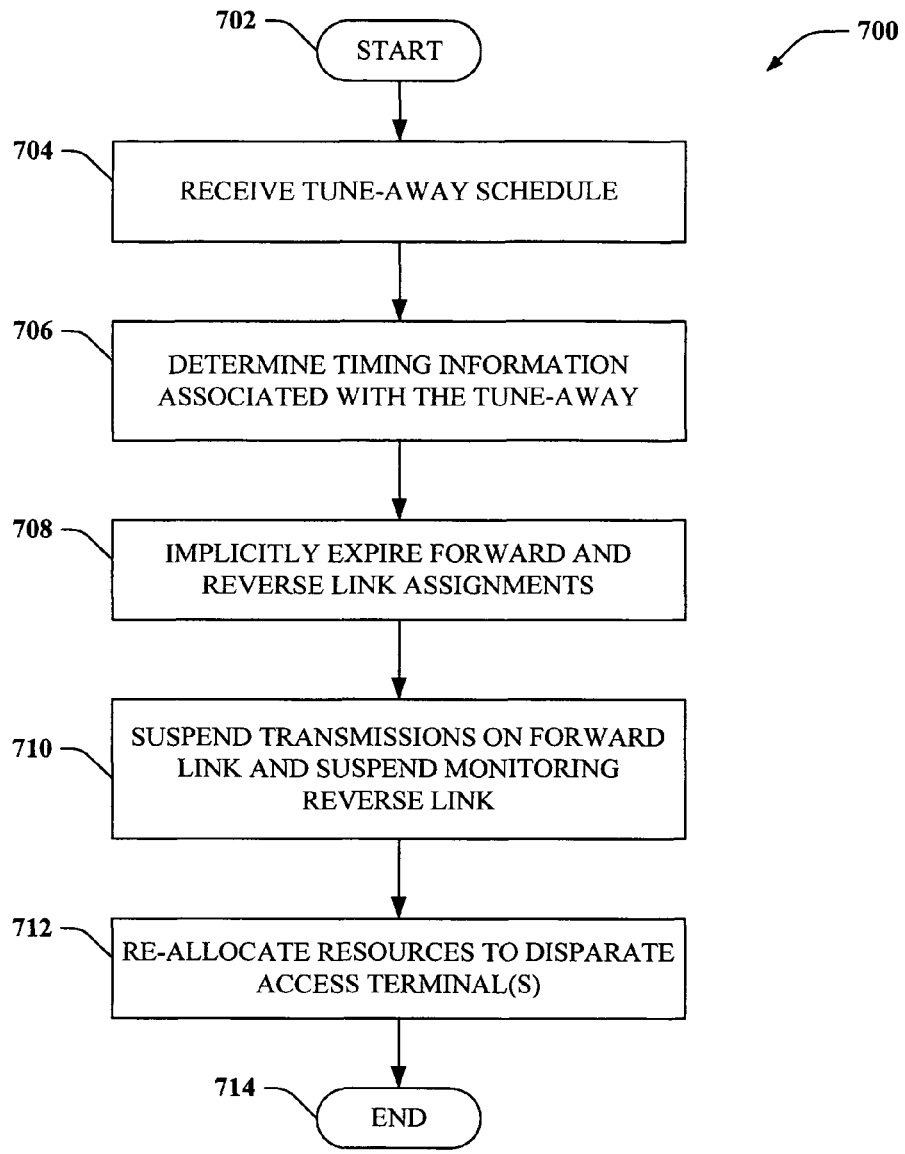
FIG. 7 is a representative flow diagram illustrating a methodology for allocating resources in a wireless environment during a tune-away.

Referring now to FIG. 7, a methodology 700 for allocating resources in a wireless communications environment is illustrated. The methodology 700 starts at 702, and at 704 a tune-away schedule is received at an access point from an access terminal. At 706 the schedule is analyzed and timing information associated with the tune-away is determined. At 708, at a frame boundary prior to the tune-away, forward link and reverse link resource assignments with respect to the access terminal are implicitly expired at an access point that is servicing the access terminal. At 710, transmissions on a forward link are suspended to the access terminal and a reverse link is not monitored for communications from the access terminal. At 712, resources that were allocated for the access terminal are re-allocated to one or more disparate access terminals serviced by the access point or sector. This re-allocation of resources enables throughput associated with the access point to remain optimized. The methodology 700 completes at 714.

Figure 8:
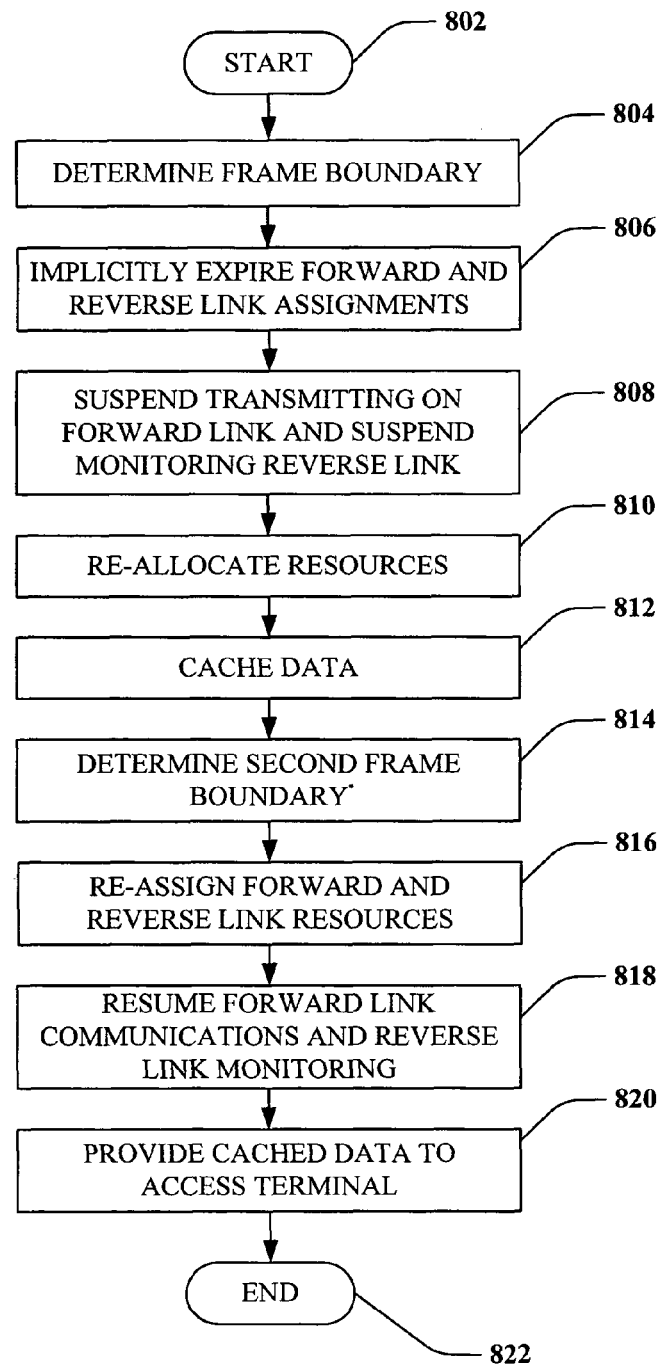
FIG. 8 is a representative flow diagram illustrating a methodology for expiring and returning resources in a wireless environment.

Now referring to FIG. 8, a methodology 800 for re-allocating resources in a wireless communications environment is illustrated. The methodology 800 begins at 802, and at 804 a frame boundary that is located in time just prior to a scheduled occurrence of a tune-away is determined. At 806, when such time arrives forward and reverse link resource assignments are implicitly expired with respect to an access terminal that will be undertaking the tune-away. At 808, transmissions on a forward link are suspended and monitoring on a reverse link is suspended. At 810, resources associated with the access terminal can be provided to other access terminals. At 812, data intended for the access terminal during the tune-away is cached. At 814, a frame boundary that is located in time just subsequent to a scheduled end of a tune-away is determined, and at 816 the forward link and reverse link resources are explicitly re-assigned. In one example, the reverse link resource assignment can be automatically assigned as a function of a most recently reported reverse link queue size with respect to an access terminal. At 818, forward link transmissions and monitoring of the reverse link is resumed, and at 820 the cached data is provided to the access terminal. The methodology 800 then completes at 822. While not illustrated in the methodology 800, a threshold time period can be monitored, and if the tune-away time exceeds such threshold, the access terminal can be disconnected from an access point that provides services to the access terminal.

Figure 9:
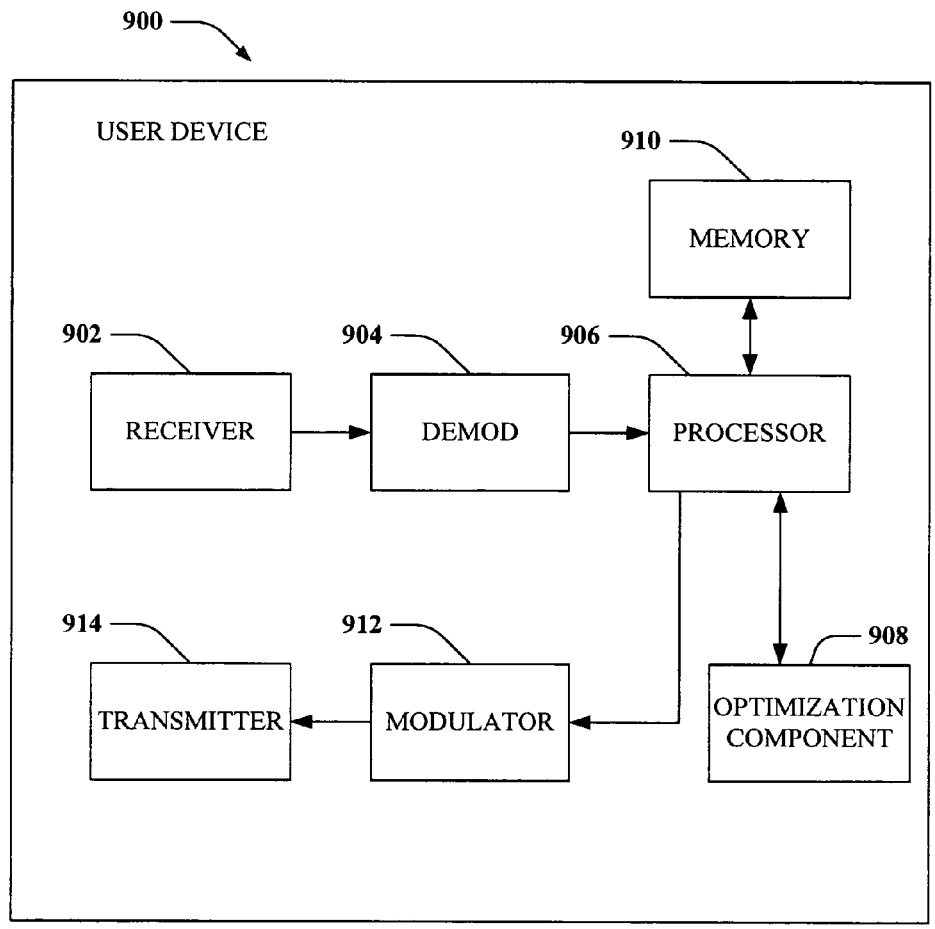
FIG. 9 is an illustration of a system that can be utilized in connection with a tune-away.

FIG. 9 illustrates a system 900 that can be utilized in connection with a tune-away. System 900 comprises a receiver 902 that receives a signal from, for instance, one or more receive antennas, and performs typical actions thereon (e.g., filters, amplifies, downconverts, . . . ) the received signal and digitizes the conditioned signal to obtain samples. A demodulator 904 can demodulate and provide received pilot symbols to a processor 906 for channel estimation.

Processor 906 can be a processor dedicated to analyzing information received by receiver component 902 and/or generating information for transmission by a transmitter 914. Processor 906 can be a processor that controls one or more portions of system 900, and/or a processor that analyzes information received by receiver 902, generates information for transmission by a transmitter 914, and controls one or more portions of system 900. System 900 can include an optimization component 908 that can optimize allocation of resources during a tune-away. Optimization component 908 may be incorporated into the processor 906. It is to be appreciated that optimization component 908 can include optimization code that performs utility based analysis in connection with assigning user devices to beams. The optimization code can utilize artificial intelligence based methods in connection with performing inference and/or probabilistic determinations and/or statistical-based determination in connection with optimizing user device beam resource assignments.

System (user device) 900 can additionally comprise memory 910 that is operatively coupled to processor 906 and that stores information such as resource assignment information, scheduling information, and the like, wherein such information can be employed with allocating resources during a tune-away procedure. Memory 910 can additionally store protocols associated with generating lookup tables, etc., such that system 900 can employ stored protocols and/or algorithms to increase system capacity. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 910 of the subject systems and methods is intended to comprise, without being limited to, these and any other suitable types of memory. The processor 906 is connected to a symbol modulator 912 and transmitter 914 that transmits the modulated signal.

Figure 10:
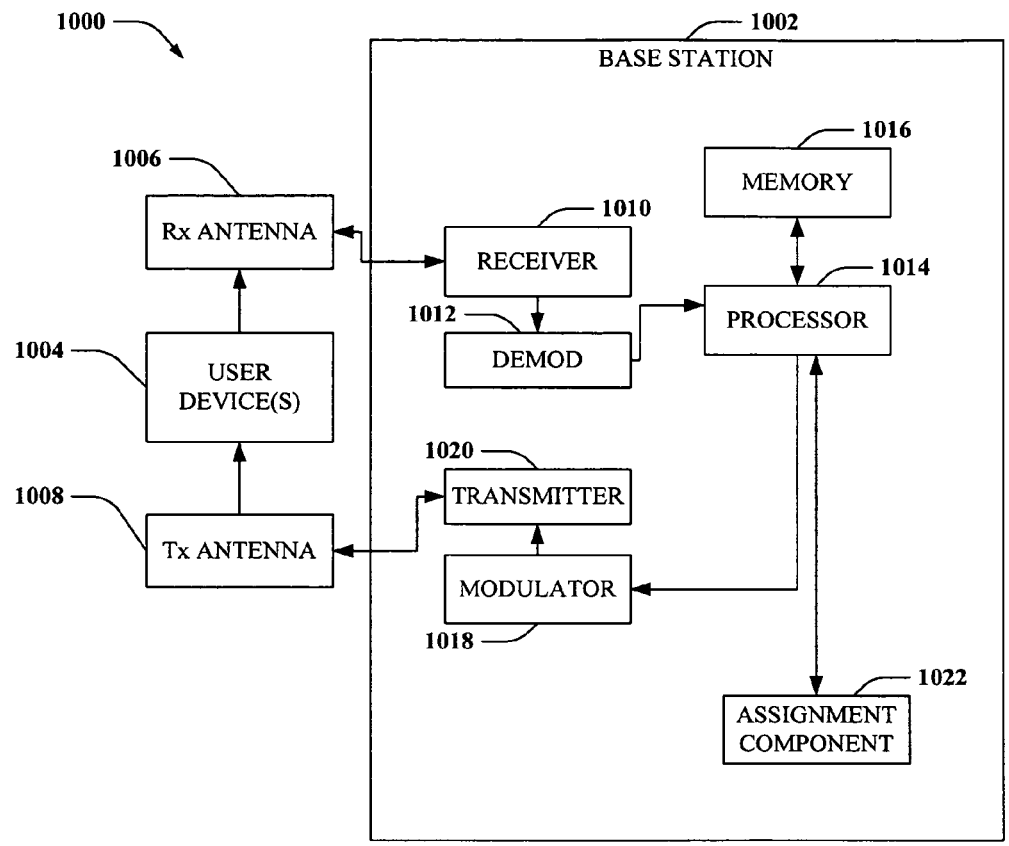
FIG. 10 is an illustration of a system that can be utilized in connection with a tune-away.

FIG. 10 illustrates a system that may be utilized in connection with performing a tune-away and/or allocating resources during a tune-away. System 1000 comprises a base station 1002 with a receiver 1010 that receives signal(s) from one or more user devices 1004 via one or more receive antennas 1006, and transmits to the one or more user devices 1004 through a plurality of transmit antennas 1008. In one example, receive antennas 1006 and transmit antennas 1008 can be implemented using a single set of antennas. Receiver 1010 can receive information from receive antennas 1006 and is operatively associated with a demodulator 1012 that demodulates received information. Receiver 1010 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. For instance, multiple receivers can be employed (e.g., one per receive antenna), and such receivers can communicate with each other to provide improved estimates of user data. Demodulated symbols are analyzed by a processor 1014 that is similar to the processor described above with regard to FIG. 9, and is coupled to a memory 1016 that stores information related to user device assignments, lookup tables related thereto and the like. Receiver output for each antenna can be jointly processed by receiver 1010 and/or processor 1014. A modulator 1018 can multiplex the signal for transmission by a transmitter 1020 through transmit antennas 1008 to user devices 1004.

Base station 1002 further comprises an assignment component 1022, which can be a processor distinct from or integral to processor 1014, and which can evaluate a pool of all user devices in a sector served by base station 1004 and can assign user devices to beams based at least in part upon the location of the individual user devices.

Figure 11:
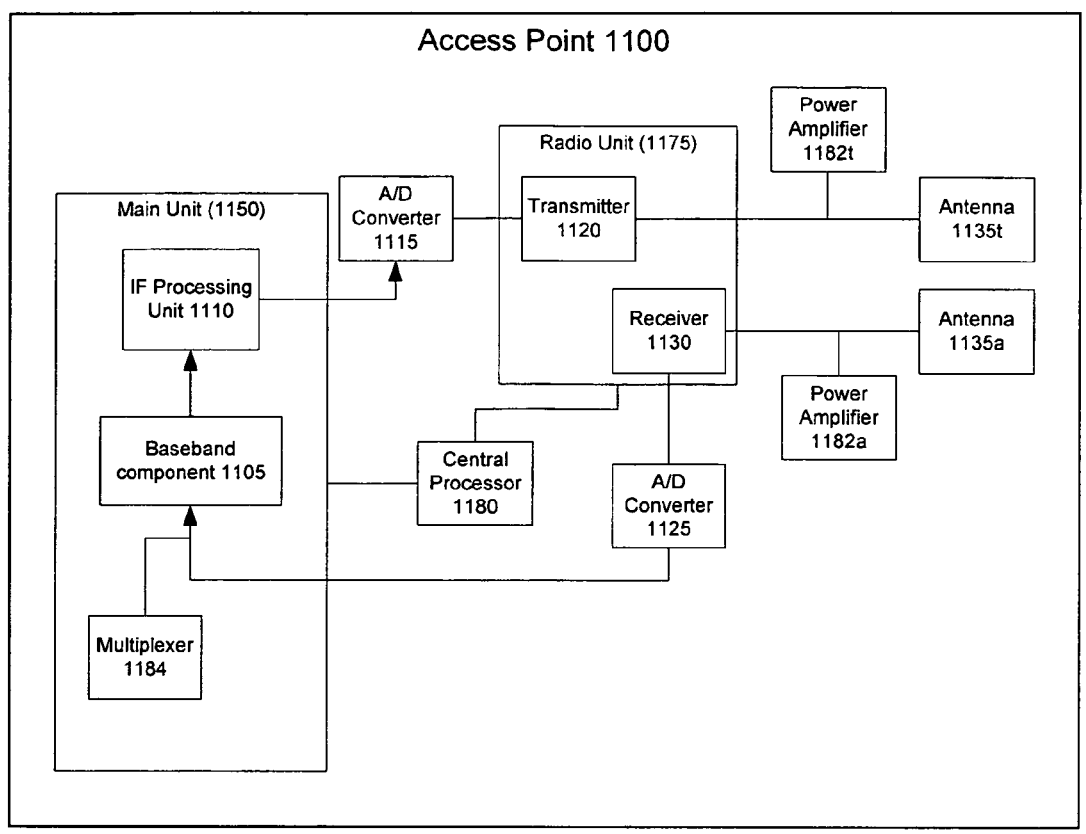
FIG. 11 is an illustration of an access point system.

As shown in FIG. 11, a radio access point can comprise a main unit (MU) 1150 and a radio unit (RU) 1175. MU 1150 includes the digital baseband components of an access point. For example, MU 1150 can include a baseband component 1105 and a digital intermediate frequency (IF) processing unit 1110. Digital IF processing unit 1110 digitally processes radio channel data at an intermediate frequency by performing such functions as filtering, channelizing, modulation, and so forth. RU 1175 includes the analog radio parts of the access point. As used herein, a radio unit is the analog radio parts of an access point or other type of transceiver station with direct or indirect connection to a mobile switching center or corresponding device. A radio unit typically serves a particular sector in a communication system. For example, RU 1175 can include one or more receivers 1130 connected to one more antennas 1135*a-t* for receiving radio communications from mobile subscriber units. In an aspect, one or more power amplifiers 1182 *a-t* are coupled to one or more antennas 1135 *a-t*. Connected to receiver 1130 is an analog-to-digital (A/D) converter 1125. A/D converter 125 converts the analog radio communications received by receiver 1130 into digital input for transmission to baseband component 1105 via digital IF processing unit 1110. RU 1175 can also include one or more transmitter 1120 connected to either the same or different antenna 1135 for transmitting radio communications to access terminals. Connected to transmitter 1120 is a digital-to-analog (D/A) converter 1115. D/A converter 1115 converts the digital communications received from baseband component 1105 via digital IF processing unit 1110 into analog output for transmission to the mobile subscriber units. In some embodiments, a multiplexer 1184 for multiplexing of multiple-channel signals and multiplexing of a variety of signals including a voice signal and a data signal. A central processor 1180 is coupled to main unit 1150 and Radio Unit for controlling various processing which includes the processing of voice or data signal.

It is to be understood that the embodiments described herein may be implemented by hardware, software, firmware, middleware, microcode, or any combination thereof. For a hardware implementation, the processing units within an access point or an access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes examples of the claimed subject matter. It is, of course, not possible to describe every conceivable combination of components or methodologies for purposes of describing such subject matter, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A resource assignment method during a tune-away procedure, comprising:
    determining a first instance in time that a tune-away will initiate with respect to an access terminal;
    determining a second instance in time that corresponds to a latest frame boundary associated with the access terminal prior to the instance in time that the tune-away initiates;
    determining resource assignment parameters associated with the access terminal and implementing the resource assignment parameters at the second instance in time;
    implicitly expiring an assignment of resources between the access terminal and an access point at the second instance in time; and
    explicitly re-assigning base station resources from the access terminal to at least one disparate access terminal beginning at the second instance in time.

2. The method of claim 1, further comprising suspending communications to the access terminal over a forward link at the second instance in time.

3. The method of claim 1, further comprising suspending monitoring reverse link control channels associated with the access terminal at the second instance in time.

4. The method of claim 1, further comprising:
    caching data intended for the access terminal during the tune-away; and
    providing the access terminal with the data upon completion of the tune-away.

5. The method of claim 1, wherein the determining of the first instance includes determining the first instance in time that an inter-frequency tune-away will initiate with respect to the access terminal.

6. The method of claim 1, wherein the determining of the first instance includes determining the first instance in time that an inter-technology tune-away will initiate with respect to the access terminal.

7. The method of claim 1, further comprising:
    expiring an assignment of resources between the access terminal and an access point during the tune-away;
    determining a duration of the tune-away; and determining a third instance in time that corresponds to a frame boundary that occurs immediately after the duration of the tune-away.

8. The method of claim 7, further comprising:
re-assigning the resources to the access terminal at the third instance in time;
delivering data to the access terminal over a forward link after the re-assignment of resources; and
monitoring reverse link control channels after the re-assignment of resources.

9. The method of claim 1, further comprising:
expiring reverse link and forward link resource assignments at the access terminal at the second instance in time;
suspending transmissions in a reverse link at the access terminal after the resource assignments have been expired; and
suspending monitoring on a forward link at the access terminal after the resource assignments have been expired.

10. The method of claim 1, further comprising:
determining periodicity of tune-aways with respect to the access terminal; and
scheduling resource assignments in a sector as a function of the determined periodicity.

11. The method of claim 1, further comprising determining a tune-away schedule associated with the access terminal.

12. The method of claim 1, further comprising updating an active set as a function of parameters associated with the tune-away.

13. The method of claim 1, further comprising:
analyzing a service utilized by the access terminal; and
determining resource assignment parameters as a function of the service.

14. The method of claim 1, further comprising:
monitoring length of time associated with the tune-away; and
disconnecting the access terminal from an access point if the length of time is above a defined threshold.

15. The method of claim 1, further comprising optimizing resource allocations prior to the tune-away.

16. The method of claim 1, further comprising optimizing resource allocations upon completion of the tune-away.

17. The method of claim 1, further comprising automatically assigning resources associated with a reverse link as a function of a most recently reported reverse link queue size of the access terminal.

18. A wireless communications apparatus, comprising:
a memory that includes a schedule for a tune-away with respect to an access terminal; and
a processor that determines a frame boundary that occurs in time immediately prior to a time of commencement of the tune-away and implicitly expires resource assignments for the access terminal at a time that corresponds to the determined frame boundary at an access point associated therewith as a function of content of the schedule, the processor re-assigning resources from the access terminal to at least one disparate access terminal beginning at the time corresponding to the determined frame boundary.

19. The apparatus of claim 18, further comprising a data storage unit that includes data cached during the tune-away.

20. The apparatus of claim 18, the processor causes transmissions to be suspended on a forward link as a function of the content of the schedule.

21. The apparatus of claim 18, the processor causes monitoring of a reverse link to be suspended as a function of the content of the schedule.

22. The apparatus of claim 18, the processor is employed to determine a frame boundary that occurs in time immediately subsequent to completion of the tune-away.

23. An apparatus for allocating base station resources during a tune away, comprising:
means for determining when an access terminal is going to undertake a tune-away;
means for expiring resource assignments implicitly at a frame boundary associated with the access terminal prior to the tune-away; and
means for allocating base station resources associated with the access terminal to one or more disparate access terminals during the tune-away.

24. The apparatus of claim 23, further comprising means for caching data intended for the access terminal during the tune-away.

25. The apparatus of claim 24, further comprising means for providing the access terminal with the cached data upon completion of the tune-away.

26. The apparatus of claim 23, further comprising means for re-establishing the resource assignments to the access terminal in a frame subsequent to the tune-away.

27. A computer-readable medium having stored thereon computer-executable instructions for:
receiving an indication that a tune-away will occur at time t1 with respect to a first access terminal;
locating a latest frame boundary that occurs at a first point in time prior to t1;
implicitly expiring reverse link resource assignments at the first point in time;
implicitly expiring forward link resource assignments at the first point in time;
suspending transmissions on a reverse link after the reverse link resource assignments have been expired;
suspending monitoring of a forward link after the forward link resource assignments have been expired;
re-assigning base station resources from the first access terminal to at least one disparate access terminal beginning at the first point in time; and
performing the tune-away at time t1.

28. The computer-readable of claim 27, the instructions further comprising:
receiving an indication that the tune-away will be complete at time t2;
locating a frame boundary that occurs at a second point in time immediately after t2;
transmitting control information on the reverse link at the second point in time; and
monitoring the reverse link at the second point in time.

29. The computer-readable medium of claim 27, the instructions further comprising:
receiving a pilot signal during the tune-away;
generating a pilot signal report; and
communicating the pilot signal report to an access point.

30. A processor that executes instructions for allocating resources in a wireless communications environment, the instructions comprising:
upon receiving an indication that an access terminal will perform a tune-away, locating a frame boundary just prior to performance of the tune-away;
expiring resource assignments associated with the access terminal at a time associated with the frame boundary; and reallocating base station resources associated with the access terminal to at least one disparate access terminal during the tune-away.

31. The processor of claim 30, the instructions further comprising re-allocating the resources associated with the access terminal to the access terminal upon completion of the tune-away.

* * * * *